(12) United States Patent
Andoh et al.

(10) Patent No.: US 8,174,748 B2
(45) Date of Patent: May 8, 2012

(54) MIRROR AND OPTICAL SCANNING DEVICE

(75) Inventors: Fumikata Andoh, Kanagawa (JP); Hiroshi Takemoto, Kanagawa (JP); Jun Yoshida, Kanagawa (JP); Masatoshi Arima, Fukushima-ken (JP); Norio Sato, Fukushima-ken (JP); Seiji Usui, Fukushima-ken (JP)

(73) Assignees: Ricoh Company, Ltd., Tokyo (JP); Kishiro Hikari Kagaku Co., Ltd., Sukagawa (JP)

( * ) Notice: Subject to any disclaimer, the term of this patent is extended or adjusted under 35 U.S.C. 154(b) by 666 days.

(21) Appl. No.: 12/256,991

(22) Filed: Oct. 23, 2008

(65) Prior Publication Data

US 2009/0136263 A1   May 28, 2009

(30) Foreign Application Priority Data

Nov. 26, 2007   (JP) ................. 2007-304811

(51) Int. Cl.
   *G02B 26/08*   (2006.01)
(52) U.S. Cl. ..................... 359/208.1; 359/867
(58) Field of Classification Search .... 359/208.1–208.2, 359/867–869
   See application file for complete search history.

(56) References Cited

U.S. PATENT DOCUMENTS

| 4,592,622 | A | * | 6/1986 | Hashimoto et al. ...... 359/485.07 |
| 4,823,002 | A | * | 4/1989 | Saito .............................. 250/235 |
| 5,715,099 | A | | 2/1998 | Takemoto |
| 6,000,784 | A | | 12/1999 | Takemoto et al. |
| 6,175,439 | B1 | | 1/2001 | Ozaki et al. |
| 6,217,684 | B1 | | 4/2001 | Morii et al. |
| 6,224,709 | B1 | | 5/2001 | Takemoto et al. |
| 6,472,247 | B1 | | 10/2002 | Andoh et al. |
| 6,693,751 | B2 | | 2/2004 | Morii et al. |
| 6,762,492 | B2 | | 7/2004 | Nakajima et al. |
| 6,795,257 | B2 | | 9/2004 | Andoh et al. |
| 7,113,317 | B2 | | 9/2006 | Andoh et al. |
| 7,301,685 | B2 | | 11/2007 | Andoh et al. |
| 7,414,797 | B2 | | 8/2008 | Andoh |
| 2003/0030923 | A1 | * | 2/2003 | Hsu et al. ...................... 359/857 |
| 2005/0012975 | A1 | * | 1/2005 | George et al. ................. 359/223 |
| 2008/0117486 | A1 | | 5/2008 | Andoh et al. |

FOREIGN PATENT DOCUMENTS

| JP | 2637016 | 4/1997 |
| JP | 2000-155204 | 6/2000 |
| JP | 2005-275029 | 10/2005 |
| JP | 2006-171059 | 6/2006 |
| JP | 2007-192949 | 8/2007 |
| JP | 2009-008883 | 1/2009 |
| JP | 2009-8883 | 1/2009 |

OTHER PUBLICATIONS

Japanese Office Action (2007-304811) dated Nov. 16, 2011.

* cited by examiner

*Primary Examiner* — Jennifer L. Doak
(74) *Attorney, Agent, or Firm* — Oblon, Spivak, McClelland, Maier & Neustadt, L.L.P.

(57) ABSTRACT

A mirror includes a substrate, a reflection layer, and a protection layer. The substrate includes a surface having an attachment area and a reflection area. The reflection layer is formed on the reflection area. The protection layer is formed on the reflection area on which the reflection layer is formed and the attachment area. Material of the protection layer is homogeneous across the reflection area and the attachment area.

15 Claims, 7 Drawing Sheets

US 8,174,748 B2

MIRROR AND OPTICAL SCANNING DEVICE

CROSS-REFERENCE TO RELATED APPLICATIONS

The present application claims priority to and incorporates by reference the entire contents of Japanese priority document 2007-304811 filed in Japan on Nov. 26, 2007.

BACKGROUND OF THE INVENTION

1. Field of the Invention

The present invention relates to a mirror and an optical scanning device for scanning a scanning surface with a light in an image forming apparatus.

2. Description of the Related Art

A conventional image forming apparatus employing the Carlson process forms an image by scanning the surface of a rotating photosensitive element with a light beam to form a latent image, developing the latent image with toner to form a toner image, and then transferring the toner image onto a recording medium (hereinafter, "sheet"). Such an image forming apparatus is often used as an on-demand printing system for simple printing. In recent years, a color image forming apparatus having such a configuration has been widely used.

One type of color image forming apparatus includes a single photosensitive element for a plurality of colors. Such an image forming apparatus forms a plurality of toner images corresponding to the colors on the surface of the photosensitive element in a superimposed manner, and transfers the toner images formed on the surface of the photosensitive element onto a sheet. The other type of color image forming apparatus includes a plurality of photosensitive elements each corresponding to a different color (hereinafter, "tandem-type image forming apparatus"). The tandem-type image forming apparatus forms a corresponding toner image on the surface of each of the photosensitive elements, and transfers the toner images on the surfaces of the photosensitive elements onto a sheet in a superimposed manner. Because both types of color image forming apparatuses form the toner images in a superimposed manner to form a full color image, it is necessary to transfer the toner images onto a sheet at predetermined positions with high accuracy.

The accuracy of forming the toner images on the sheet depends on relative positions between a shaping optical system that shapes a light beam emitted from a light source and an optical element included in a projection optical system that projects the light beam onto the photosensitive element. Therefore, an optical element, such as a mirror disclosed in, for example, Japanese Patent No. 2637016 or Japanese Patent Application Laid-open No. 2000-155204, needs to be set in an appropriate position with respect to the shaping optical system with high accuracy.

To reduce the number of components used in the color image forming apparatus and facilitate assembling the components, the above mirror is arranged in the color image forming apparatus such that a part of the mirror is attached to a supporting unit arranged in a housing accommodating the optical system or the like. In such a case, because it is necessary to prevent occurrence of registration misalignment or color misalignment due to change of the relative positions between the mirror and the shaping optical system, hydrophilic nature of the surface of the mirror on the attachment side (hereinafter, "attachment surface") needs to be increased to improve attachment strength of the mirror.

SUMMARY OF THE INVENTION

It is an object of the present invention to at least partially solve the problems in the conventional technology.

According to an aspect of the present invention, there is provided a mirror that includes a substrate including a surface having a first area and a second area; a reflection layer formed on the first area; and a protection layer formed on the first area with the reflection layer formed and the second area, wherein material of the protection layer is homogeneous across the first area and the second area.

According to another aspect of the present invention, there is provided an optical scanning device that scans a scanning surface with a light beam in a main scanning direction and includes a light source that emits a light beam; a first mirror that deflects the light beam in the main scanning direction; and a second mirror that reflects the light beam deflected by the first mirror, wherein the second mirror includes a substrate including a surface having a first area and a second area, a reflection layer formed on the first area, and a protection layer formed on the first area with the reflection layer formed and the second area, and material of the protection layer is homogeneous across the first area and the second area.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
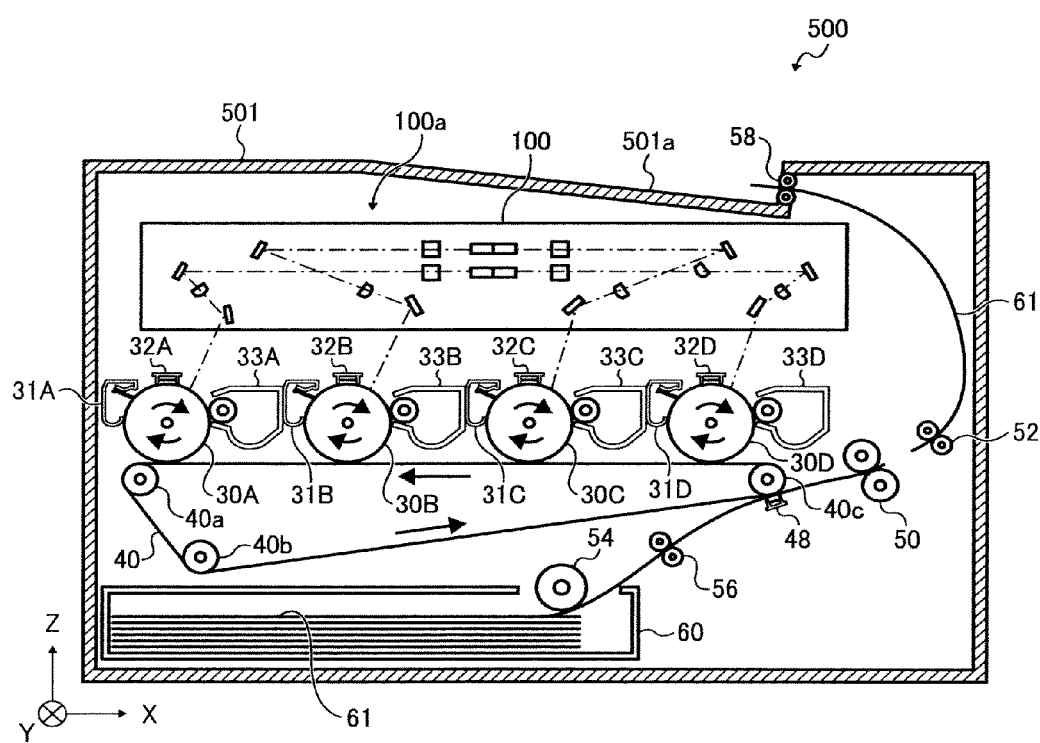
FIG. 1 is a schematic diagram of an image forming apparatus according to an embodiment of the present invention.

FIG. 1 is a schematic diagram of an image forming apparatus 500 according to an embodiment of the present invention.

The image forming apparatus 500 is, for example, a tandem-type color printer that prints a full color image on a sheet by transferring toner images of four colors, i.e., cyan, magenta, black, and yellow, onto the sheet in a superimposed manner. The image forming apparatus 500 includes an optical scanning device 100, four photosensitive elements 30A, 30B, 30C, and 30D, a transfer belt 40, a feed tray 60, a feed roller 54, first registration rollers 56, second registration rollers 52, fixing rollers 50, discharging rollers 58, a control device (not shown) that controls the above components, and a housing 501. The housing 501 accommodates the above components, and is formed into a substantially rectangular solid shape.

A discharge tray 501*a* is formed on the upper surface of the housing 501. After a printing operation on a sheet is completed, that sheet is discharged to the discharge tray 501*a*. The optical scanning device 100 is arranged under the discharge tray 501*a*.

The optical scanning device 100 causes the photosensitive element 30A to be scanned with a light beam modulated based on image data obtained from an upper-level device (a personal computer, or the like) for forming a black image, the photosensitive element 30B to be scanned with the light beam for forming a cyan image, the photosensitive element 30C to be scanned with the light beam for forming a magenta image, and the photosensitive element 30D to be scanned with the light beam for forming a yellow image. The configuration of the optical scanning device 100 will be described later in detail.

Each of the photosensitive elements 30A, 30B, 30C, and 30D is a cylindrical member having a photosensitive layer formed on its surface. The photosensitive layer has a characteristic that, when the photosensitive layer is irradiated with a light beam, an irradiated portion of the photosensitive layer becomes conductive. The photosensitive elements 30A, 30B, 30C, and 30D are arranged under the optical scanning device 100 at equal spaces in an X-axis direction.

The photosensitive element 30A is arranged at an end of the housing 501 on the negative X-axis side, taking the Y-axis direction as its longitudinal direction. The photosensitive element 30A is rotated by a rotation mechanism (not shown) in a clockwise direction in FIG. 1 (a direction indicated by an arrow in FIG. 1). A charger 32A, a toner cartridge 33A, and a cleaning case 31A are arranged around the photosensitive element 30A. The charger 32A is arranged at a twelve o'clock position (upper side) of the photosensitive element 30A in FIG. 1, the toner cartridge 33A is arranged at a two o'clock position (upper right side) of the photosensitive element 30A in FIG. 1, and the cleaning case 31A is arranged at a ten o'clock position (upper left side) of the photosensitive element 30A in FIG. 1.

The charger 32A is arranged with a predetermined clearance from the surface of the photosensitive element 30A, taking the Y-axis direction as its longitudinal direction. The charger 32A charges the surface of the photosensitive element 30A with a predetermined voltage.

The toner cartridge 33A includes a developing roller and a cartridge main body containing black toner. The developing roller is charged with a voltage having a polarity opposite to that of a voltage with which the photosensitive element 30A is charged. The toner contained in the cartridge main body is applied to the surface of the photosensitive element 30A via the developing roller.

The cleaning case 31A includes a cleaning blade that is formed into a rectangle shape, taking the Y-axis direction as its longitudinal direction. The cleaning blade is arranged such that one side of the cleaning blade is in contact with the surface of the photosensitive element 30A. The toner remained on the surface of the photosensitive element 30A is removed by the cleaning blade in accordance with rotation of the photosensitive element 30A, and the removed toner is collected in the cleaning case 31A.

Each of the photosensitive elements 30B, 30C, and 30D has the same configuration as that of the photosensitive element 30A. The photosensitive elements 30B, 30C, and 30D are sequentially arranged at predetermined spaces on the positive X-axis side from the photosensitive element 30A. Chargers 32B, 32C, 32D, toner cartridges 33B, 33C, 33D, and cleaning cases 31B, 31C, 31D are arranged around the photosensitive elements 30B, 30C, 30D in the same positional relation as the charger 32A, the toner cartridge 33A, and the cleaning case 31A arranged around the photosensitive element 30A.

Each of the chargers 32B, 32C, and 32D has the same configuration as that of the charger 32A. The chargers 32B, 32C, and 32D charge the surfaces of the photosensitive elements 30B, 30C, and 30D with a predetermined voltage.

Each of the toner cartridges 33B, 33C, and 33D includes a cartridge main body and a developing roller. The cartridge main bodies contain cyan, magenta, and yellow toners. The developing rollers are charged with voltages having polarities opposite to those of voltages with which the photosensitive elements 30B, 30C, and 30D are charged. The toners contained in the cartridge main bodies are applied to the surfaces of the photosensitive elements 30B, 30C, and 30D via the developing rollers.

Each of the cleaning cases 31B, 31C, and 31D has the same configuration as that of the cleaning case 31A, and is operated in the same manner as the cleaning case 31A is.

In the following description, the photosensitive element 30A, the charger 32A, the toner cartridge 33A, and the cleaning case 31A are collectively referred to as a first station, the photosensitive element 30B, the charger 32B, the toner cartridge 33B, and the cleaning case 31B as a second station, the photosensitive element 30C, the charger 32C, the toner cartridge 33C, and the cleaning case 31C as a third station, and the photosensitive element 30D, the charger 32D, the toner cartridge 33D, and the cleaning case 31D as a fourth station.

The transfer belt 40 is an endless loop member. The transfer belt 40 is supported by driven rollers 40*a*, 40*c* and a drive roller 40*b* such that the upper side of the transfer belt 40 is in contact with the lower sides of the surfaces of the photosensitive elements 30A, 30B, 30C, and 30D. The driven rollers 40*a* and 40*c* are arranged under the photosensitive elements 30A and 30D, respectively. The drive roller 40*b* is arranged at a slightly lower position than the driven rollers 40*a* and 40*c*. When the drive roller 40*b* is rotated in a counterclockwise direction in FIG. 1, the transfer belt 40 is rotated in the counterclockwise direction (in a direction indicated by an arrow in FIG. 1). A transfer charger 48 is arranged near the end of the transfer belt 40 on the positive X-axis side. A voltage applied to the transfer charger 48 has a polarity opposite to those of voltages applied to the chargers 32A, 32B, 32C, and 32D.

The feed tray 60 is arranged under the transfer belt 40. The feed tray 60 is formed into a substantially rectangular solid shape, and contains a stack of sheets 61 on which an image is to be formed. A rectangular feed opening is formed near the end of the upper surface of the feed tray 60 on the positive X-axis side.

The feed roller 54 picks up the sheet 61 from the feed tray 60 one by one, and conveys the sheet 61 toward a space formed between the transfer belt 40 and the transfer charger 48 through the first registration rollers 56.

The fixing rollers 50 fix an image to the surface of the sheet 61 with heat and pressure, and then convey the sheet 61 toward the discharging rollers 58 through the second registration rollers 52.

The discharging rollers 58 cause the sheet 61 to be stacked on the discharge tray 501a.

Figure 2:
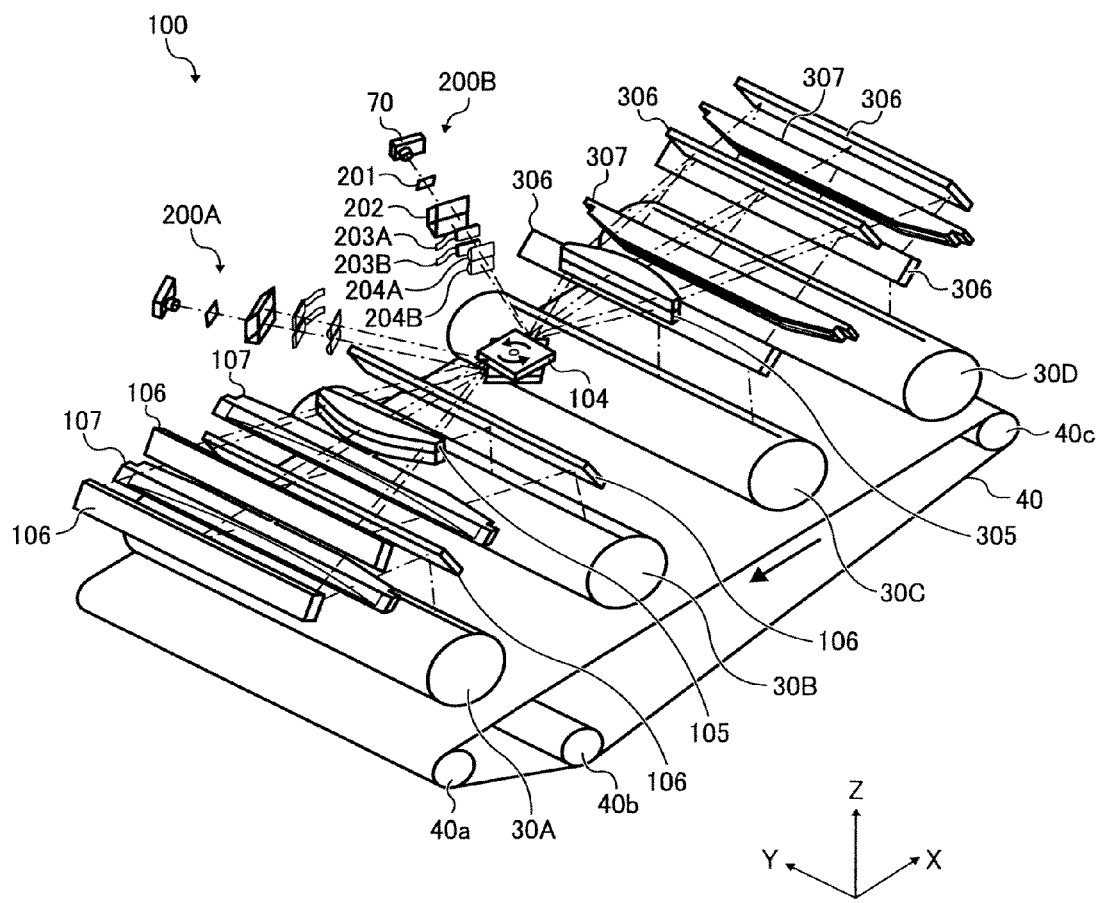
FIG. 2 is a perspective view of an optical scanning device shown in FIG. 1.
Figure 3:
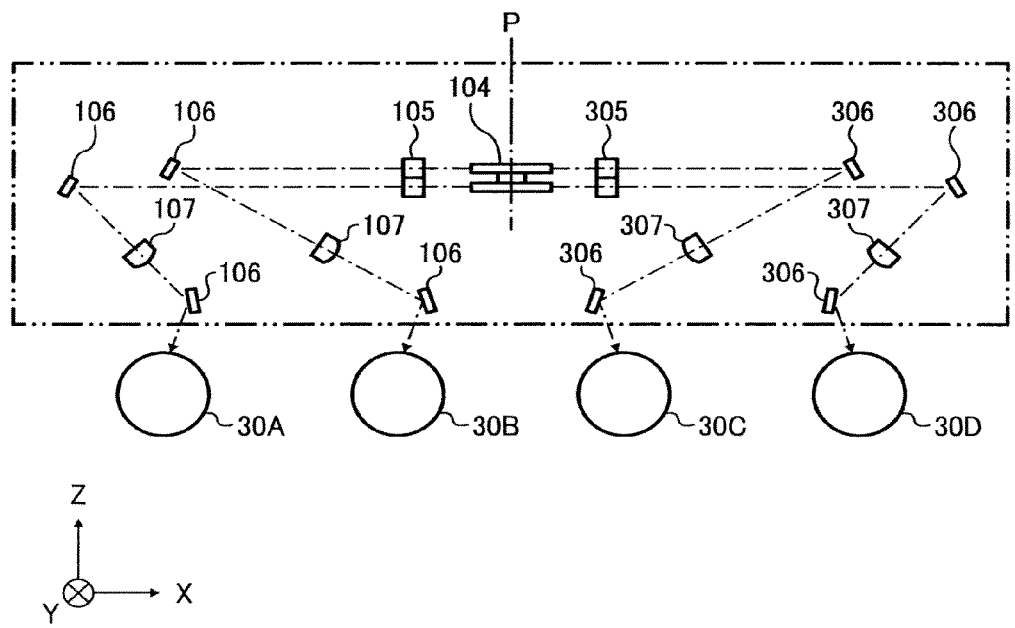
FIG. 3 is a side view of the optical scanning device shown in FIG. 2.

FIG. 2 is a perspective view of the optical scanning device 100. FIG. 3 is a side view of the optical scanning device 100. The optical scanning device 100 includes an incidence optical system 200A, an incidence optical system 200B, a scanning optical system, and an optical housing 100a. The incidence optical system 200A causes a light beam to be projected onto a polygon mirror 104, so that each of the surfaces of the photosensitive elements 30A and 30B is scanned with the light beam. The incidence optical system 200B causes a light beam to be projected onto the polygon mirror 104, so that each of the surfaces of the photosensitive elements 30C and 30D is scanned with the light beam. The scanning optical system includes the polygon mirror 104, fθ lenses 105, 305, reflecting mirrors 106, 306, and toroidal lenses 107, 307. The fθ lenses 105, 305, the reflecting mirrors 106, 306, and the toroidal lenses 107, 307 are arranged along optical paths of light beams deflected by the polygon mirror 104. The optical housing 100a accommodates the above components.

Each of the incidence optical system 200A and the incidence optical system 200B causes a light beam to be projected onto one of deflecting surfaces of the polygon mirror 104 in a direction at 120 degrees or 60 degrees with respect to the X-axis direction. As shown in FIG. 2, the incidence optical system 200B includes a light source device 70, an aperture member 201, a beam splitting prism 202, a pair of liquid crystal elements 203A, 203B, and a pair of cylindrical lenses 204A, 204B. The aperture member 201, the beam splitting prism 202, the liquid crystal elements 203A, 203B, and the cylindrical lenses 204A, 204B are sequentially arranged along an optical path of a light beam emitted from the light source device 70. The incidence optical system 200A has the same configuration as that of the incidence optical system 200B.

The light source device 70 includes a surface-emitting semiconductor laser array having a plurality of vertical-cavity surface-emitting lasers (VCSELs) formed in two-dimensional array, and a coupling lens that couples light beams emitted from the VCSELs. The light source device 70 emits a plurality of light beams toward the polygon mirror 104.

The aperture member 201 has a rectangular aperture, and is arranged such that the center of the aperture is located at or near a focus position of the coupling lens included in the light source device 70.

The beam splitting prism 202 divides each of the light beams from the light source device 70 into two light beams that are spaced apart from each other with a predetermined distance in a perpendicular direction (in a sub-scanning direction).

The liquid crystal elements 203A and 203B are adjacently arranged one above the other such that the liquid crystal elements 203A and 203B receive the light beams divided by the beam splitting prism 202. Each of the liquid crystal elements 203A and 203B deflects the light beam in the sub-scanning direction based on a voltage signal from a control device (not shown).

The cylindrical lenses 204A and 204B are adjacently arranged one above the other such that the cylindrical lenses 204A and 204B receive the light beams divided by the beam splitting prism 202. Each of the cylindrical lenses 204A and 204B converges the light beam onto the polygon mirror 104.

The polygon mirror 104 includes a pair of square prism shaped members each having four deflecting surfaces on sides of the polygon mirror 104 to deflect a light beam. The members are adjacently arranged one above the other such that the members have a phase difference of 45 degrees with respect to each other. Each of the members is rotated at a constant angular speed by a rotation mechanism (not shown) in a direction indicated by an arrow in FIG. 2. With this configuration, when a light beam is divided into two light beams by the beam splitting prism 202 in the incidence optical system 200A or the incidence optical system 200B, the light beams are converged onto the deflecting surfaces of the members and are deflected by the deflecting surfaces with a phase difference, so that the light beams are alternately projected onto the photosensitive elements.

Each of the fθ lenses 105 and 305 has an image height that is proportional to an incident angle of a light beam, and causes an image plane of the light beam deflected by the polygon mirror 104 to move at a constant speed in the Y-axis direction.

Each of the toroidal lenses 107 and 307 is arranged with its longitudinal direction along the Y-axis direction. The toroidal lenses 107 and 307 cause the light beams to be projected onto the surfaces of the photosensitive elements 30A, 30B, 30C, and 30D through the reflecting mirrors 106 and 306.

The reflecting mirrors 106 and 306 have the same configuration, and reflect received light beams. In the following description, the configuration of the reflecting mirror 106 will be explained in detail and the same explanation about the reflecting mirror 306 is not repeated.

Figure 4:
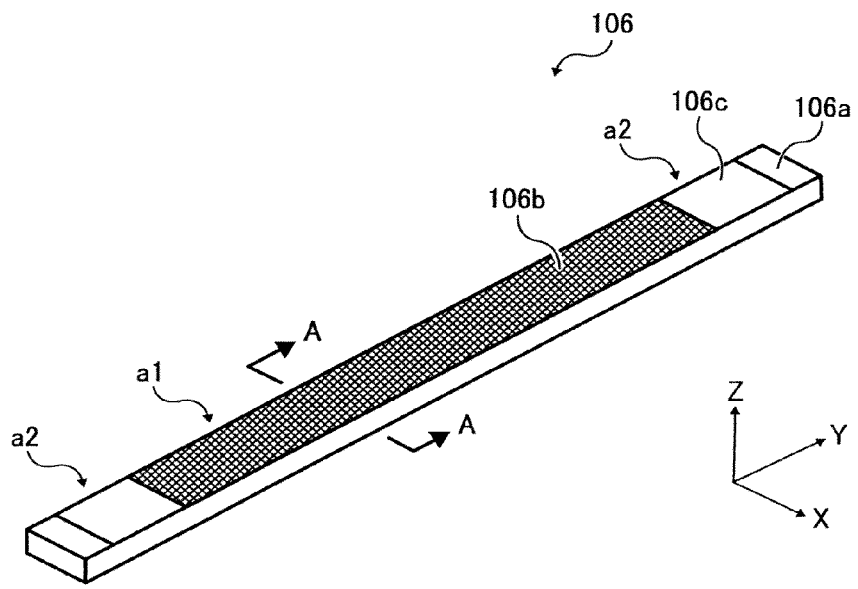
FIG. 4 is a perspective view of a reflecting mirror of the optical scanning device shown in FIG. 3.
Figure 5:
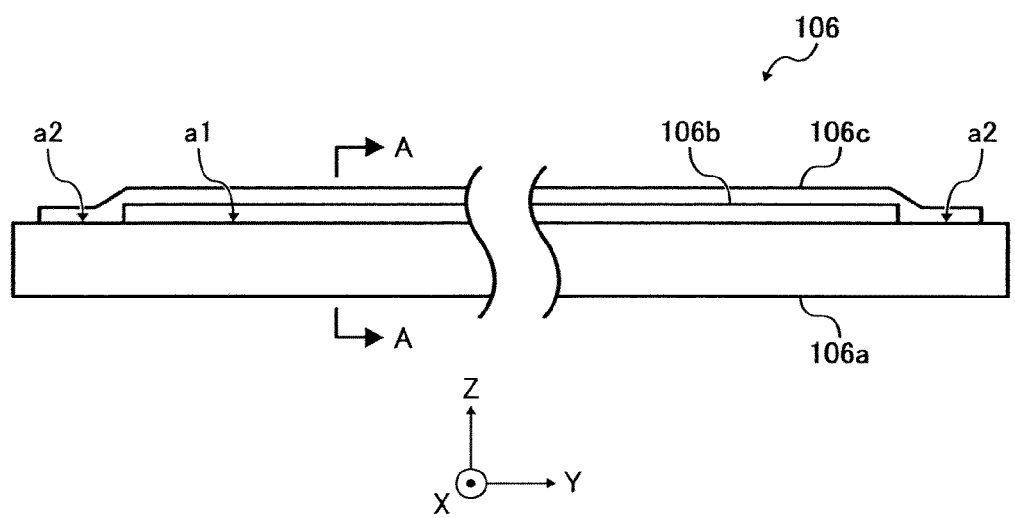
FIG. 5 is a side view of the reflecting mirror shown in FIG. 4.

FIG. 4 is a perspective view of the reflecting mirror 106. FIG. 5 is a side view of the reflecting mirror 106. The reflecting mirror 106 is formed into a rectangular solid shape. The reflecting mirror 106 includes a transparent substrate 106a that is made of, for example, glass or transparent resin and that is arranged with its longitudinal direction along the Y-axis direction. A reflection layer 106b is formed on the upper surface (the surface on the positive Z-axis side) of the transparent substrate 106a, and a protection layer 106c is formed on the reflection layer 106b and a part of the transparent substrate 106a.

The reflection layer 106b is formed on the upper surface of the transparent substrate 106a except for areas on both ends of the transparent substrate 106a, and has reflectivity for a light beam. For convenience of explanation, the areas on the ends of the upper surface of the transparent substrate 106a are referred to as attachment areas a2, and an area on the upper surface of the transparent substrate 106a except for the attachment areas a2 is referred to as a reflection area a1.

For example, after the transparent substrate 106a is precisely cleaned and then completely dried, the reflection layer 106b is formed on the reflection area a1 by depositing aluminum or alloy containing aluminum in a vacuum environment.

Figure 6:
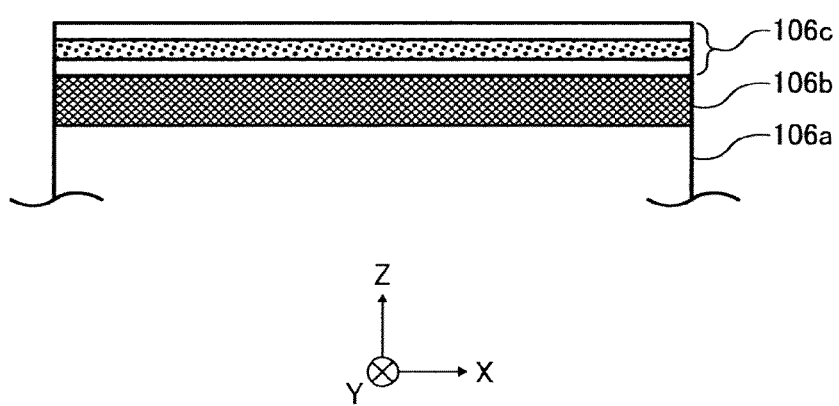
FIG. 6 is a cross section of the reflecting mirror taken along a line A-A in FIG. 5.

The protection layer 106c is continuously formed on the reflection area a1 and the attachment areas a2, and has permeability. FIG. 6 is a cross section of the reflecting mirror 106 taken along a line A-A in FIG. 5. The protection layer 106c has a three-layer structure. An uppermost layer (a layer on the positive Z-axis side) and an undermost layer (a layer on the negative Z-axis side) of the protection layer 106c are formed by depositing silicon dioxide ($SiO_2$) that has high hydrophilic nature. An intermediate layer interposed between the uppermost layer and the undermost layer is formed by depositing titanium dioxide ($TiO_2$).

As described above, the protection layer 106c is formed on the reflection area a1 and the attachment areas a2. Therefore, the reflectivity of the reflection area a1 is improved by mutual effect of the reflection layer 106b and the protection layer 106c, and the reflection layer 106b is electrically insulated by the protection layer 106c. Furthermore, the hydrophilic nature of the attachment areas a2 for an adhesive is increased. The hydrophilic nature of the surface of the protection layer 106c corresponds to the contact angle between the adhesive and the surface of the protection layer 106c when the adhesive adheres to the surface of the protection layer 106c. That is, as the contact angle decreases, the hydrophilic nature increases.

Figure 12:
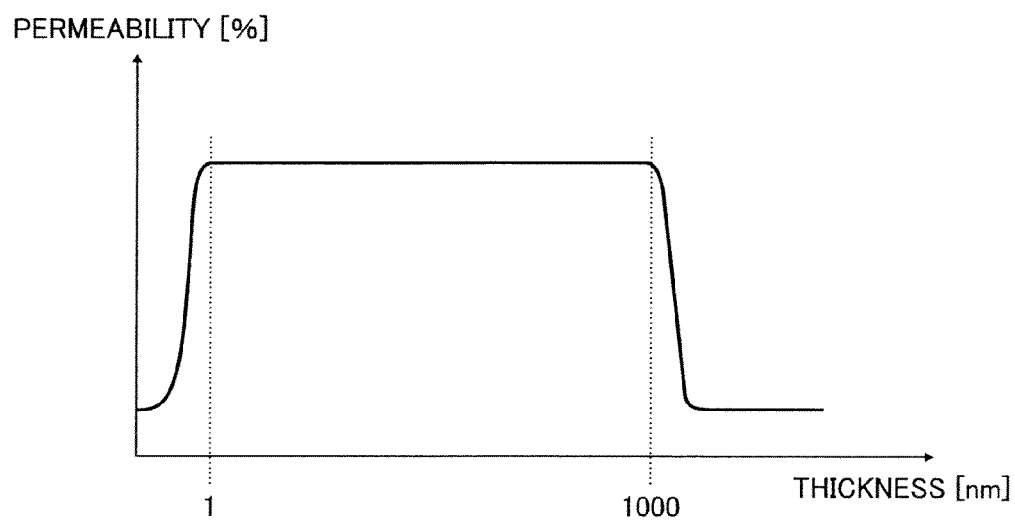
FIG. 12 is a graph for explaining a thickness characteristic of a protection layer.

It is appropriate that a thickness of the protection layer 106c is from 1 nanometer (nm) to 1000 nm. Preferably, the thickness of the protection layer 106c is set within the range from 10 nm to 360 nm. FIG. 12 is a graph of a relation between thickness of the protection layer 106c and permeability (%) of the reflecting mirror 106. When the thickness of the protection layer 106c is set within the range from 1 nm to 1000 nm, the permeability is maintained at a constant level. However, when the thickness of the protection layer 106c is smaller than 1 nm or larger than 1000 nm, the permeability is sharply decreased. Therefore, to maintain utilization efficiency of an incident light beam on the reflecting mirror 106, it is appropriate that the thickness of the protection layer 106c is set within the range from 1 nm to 1000 nm in which the reflectivity of the reflecting mirror 106 is maintained at a constant level. If the thickness of the protection layer 106c is smaller than 1 nm, the hydrophilic nature of the protection layer 106c is decreased. Therefore, to improve the hydrophilic nature of the protection layer 106c, it is preferable that the thickness of the protection layer 106c is equal to or larger than 1 nm.

Figure 7:
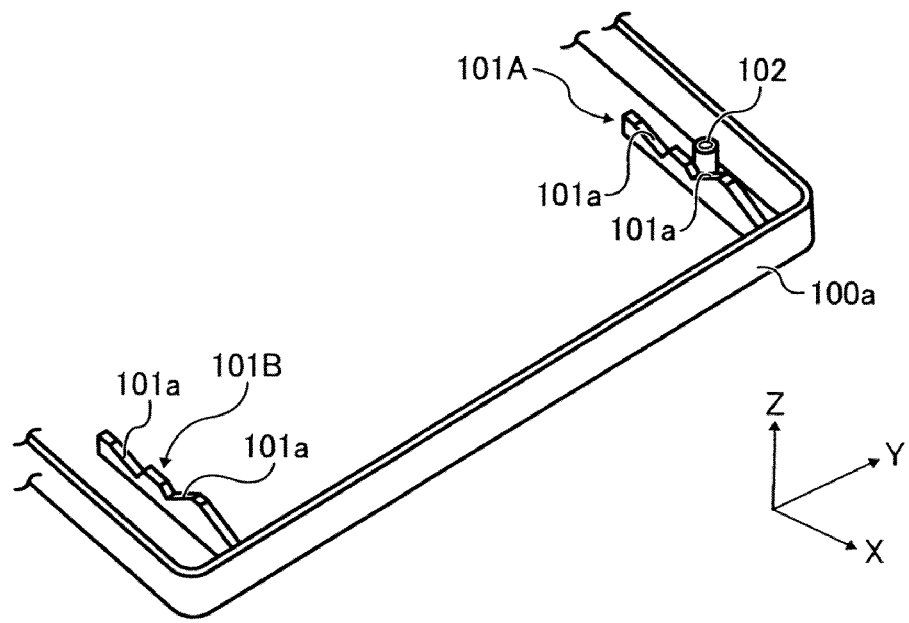
FIG. 7 is a schematic diagram of a part of an optical housing of the optical scanning device.
Figure 8:
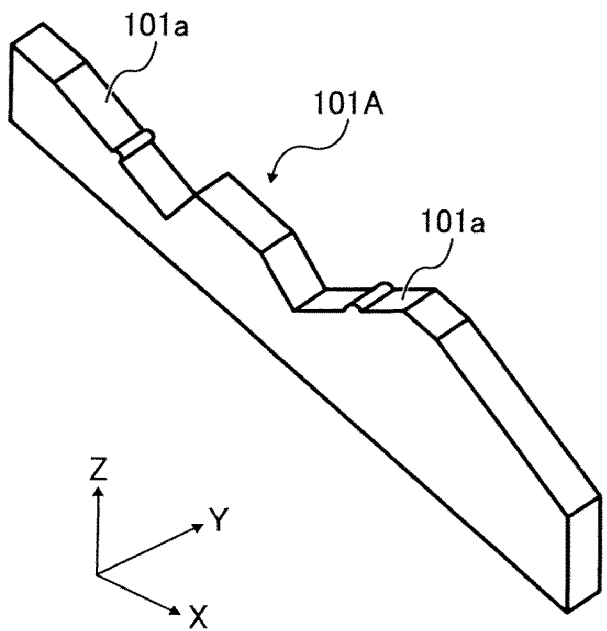
FIG. 8 is a perspective view of a rib of the optical housing shown in FIG. 7.

FIG. 7 is a schematic diagram of a part of the optical housing 100a. The optical housing 100a includes ribs 101A and 101B each having supporting surfaces 101a that support the attachment areas a2 of the reflecting mirrors 106. FIG. 8 is a perspective view of the rib 101A. Protruded portions each having a semicircular column shape are formed in the middle of the supporting surfaces 101a of the rib 101A, taking the Y-axis direction as those generatrix directions. Such a protruded portion is not formed on the rib 101B. The reflecting mirror 106 is attached to the optical housing 100a such that the both ends of the reflecting mirror 106 are supported by the ribs 101A and 101B.

Figure 9:
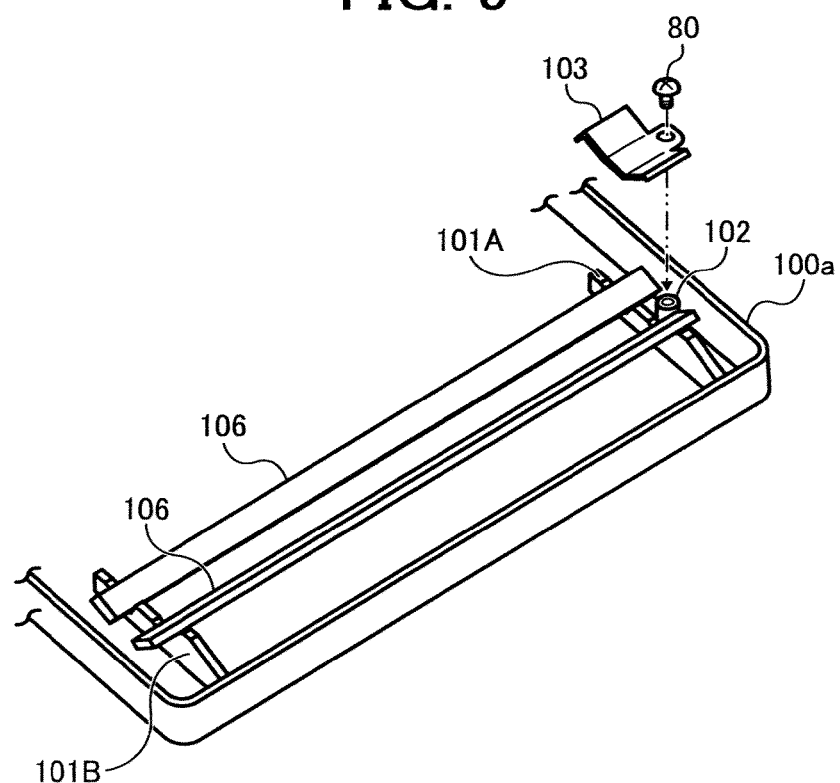
FIGS. 9 to 11 are schematic diagrams for explaining how the reflecting mirror is attached to the optical housing.
Figure 10:
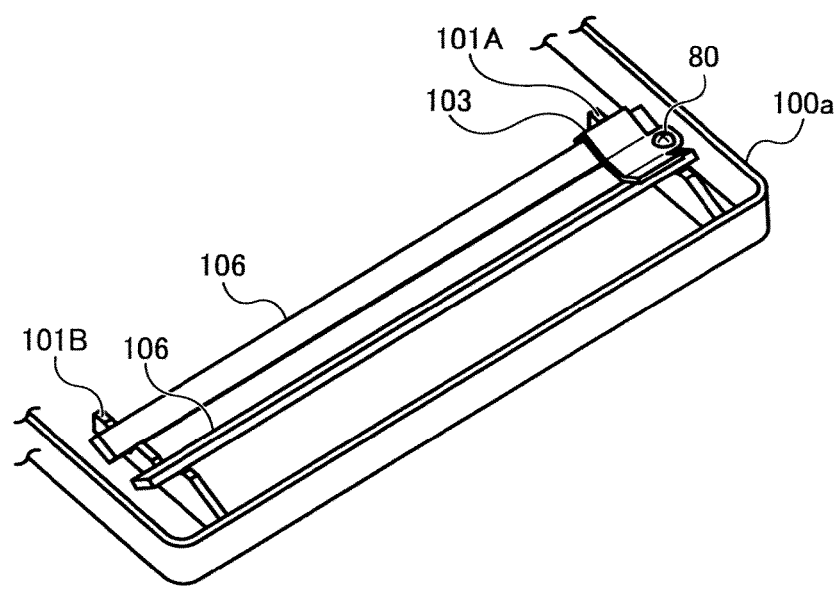
Figure 11:
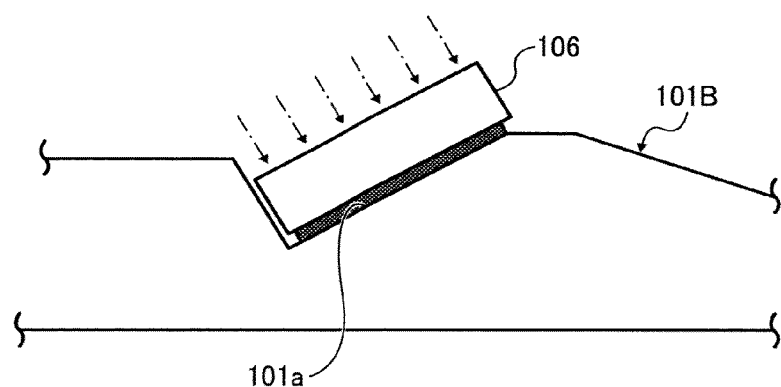

FIGS. 9 to 11 are schematic diagrams for explaining how the reflecting mirror 106 is attached to the optical housing 100a. As shown in FIG. 9, the reflecting mirrors 106 are arranged on the ribs 101A and 101B such that the attachment areas a2 of the reflecting mirrors 106 are faced to the supporting surfaces 101a of the ribs 101A and 101B. As shown in FIGS. 9 and 10, when a holding member 103 made of an elastic material is in contact with the ends of the reflecting mirrors 106 on the positive Y-axis side, a screw 80 is inserted through a circular hole formed on the holding member 103, and is engaged with a boss 102. In this manner, the attachment areas a2 on the positive Y-axis side are pressed against the supporting surfaces 101a of the rib 101A by the elastic force of the holding member 103. As described above, because the protruded portions are formed on the supporting surfaces 101a of the rib 101A such that the protruded portions are protruded toward the attachment areas a2, when the reflecting mirrors 106 are attached to the ribs 101A and 101B, the ends of the reflecting mirrors 106 on the negative Y-axis side can be moved with the ends on the positive Y-axis side as a pivot.

As shown in FIG. 11, for example, an ultraviolet cure adhesive is applied between the attachment area a2 on the end of the reflecting mirror 106 on the negative Y-axis side and the supporting surface 101a of the rib 101B, and the reflecting mirror 106 is moved by a jig (not shown) with the end of the reflecting mirror 106 on the positive Y-axis side as a pivot, so that the position of the reflecting mirror 106 is finely adjusted.

The adhesive is irradiated with an ultraviolet light via the transparent substrate 106a in a direction indicated by arrows in FIG. 11, so that the adhesive is hardened. Thus, the reflecting mirror 106 can be attached to the optical housing 100a in the state that the position of the reflecting mirror 106 has been adjusted.

When the light source device 70 of the incidence optical system 200A emits a light beam based on image data received from the upper-level device, the light beam is shaped by the aperture member 201, and is then divided into two light beams in the perpendicular direction by the beam splitting prism 202. The divided light beams enter the liquid crystal elements 203A and 203B, so that the positions of the light beams are corrected in the sub-scanning direction. Afterward, the light beams are converged onto the deflecting surfaces of the polygon mirror 104 through the cylindrical lenses 204A and 204B. The light beams deflected by the polygon mirror 104 enter the fθ lens 105.

Then, the upper one of the light beams is reflected by the reflecting mirror 106, and the reflected light beam enters the toroidal lens 107. The light beam is then converged onto the surface of the photosensitive element 30B via the reflecting mirror 106. The lower one of the light beams is reflected by the reflecting mirror 106, and the reflected light beam enters the toroidal lens 107. Then, the light beam is converged onto the surface of the photosensitive element 30A via the reflecting mirror 106. As described above, the deflecting surfaces of the upper and lower members of the polygon mirror 104 have a phase difference of 45 degrees with respect to each other. Therefore, the scanning of the photosensitive element 30B with the upper light beam and the scanning of the photosensitive element 30A with the lower light beam are alternately performed in the negative Y-axis direction.

On the other hand, when the light source device 70 of the incidence optical system 200B emits a light beam, the light beam is shaped by the aperture member 201, and is then divided into two light beams in the perpendicular direction by the beam splitting prism 202. The divided light beams enter the liquid crystal elements 203A and 203B, so that the positions of the light beams are corrected in the sub-scanning direction. Afterward, the light beams are converged onto the deflecting surfaces of the polygon mirror 104 through the cylindrical lenses 204A and 204B. The light beams deflected by the polygon mirror 104 enter the fθ lens 305.

Then, the upper one of the light beams is reflected by the reflecting mirror 306, and the reflected light beam enters the toroidal lens 307. The light beam is then converged onto the surface of the photosensitive element 30C via the reflecting mirror 306. The lower one of the light beams is reflected by the reflecting mirror 306, and the reflected light beam enters the toroidal lens 307. Then, the light beam is converged onto the surface of the photosensitive element 30D via the reflecting mirror 306. As described above, the deflecting surfaces of the upper and lower members of the polygon mirror 104 have a phase difference of 45 degrees with respect to each other. Therefore, the scanning of the photosensitive element 30C with the upper light beam and the scanning of the photosensitive element 30D with the lower light beam are alternately performed in the positive Y-axis direction.

The photosensitive layers on the surfaces of the photosensitive elements 30A, 30B, 30C, and 30D are charged by the chargers 32A, 32B, 32C, and 32D with a predetermined voltage, so that charges are distributed at uniform charge density. As described above, when the surfaces of the photosensitive elements 30A, 30B, 30C, and 30D are irradiated with light beams, irradiated portions on the surfaces of the photosensitive elements 30A, 30B, 30C, and 30D become conductive, and potentials of the irradiated portions become almost zero. When the surfaces of the photosensitive elements 30A, 30B, 30C, and 30D are irradiated with light beams that are modulated based on image data while the photosensitive elements 30A, 30B, 30C, and 30D are rotated in the directions indicated by the arrows in FIG. 1, electrostatic latent images defined by the charge distribution are formed on the surfaces of the photosensitive elements 30A, 30B, 30C, and 30D.

When the electrostatic latent images are formed on the surfaces of the photosensitive elements 30A, 30B, 30C, and 30D, toner is applied to the surfaces of the photosensitive elements 30A, 30B, 30C, and 30D by the developing rollers of the toner cartridges 33A, 33B, 33C, and 33D. Because the developing rollers are charged with voltages having polarities opposite to those of voltages with which the photosensitive elements 30A, 30B, 30C, and 30D are charged, the toner on the developing rollers have the same polarities as those of voltages with which the photosensitive elements 30A, 30B, 30C, and 30D are charged. Therefore, the toner does not adhere to portions of the surfaces of the photosensitive elements 30A, 30B, 30C, and 30D in which the charges are distributed, but the toner adheres only to the irradiated portions on the surfaces of the photosensitive elements 30A, 30B, 30C, and 30D. Thus, the electrostatic latent images are developed to form toner images on the surfaces of the photosensitive elements 30A, 30B, 30C, and 30D.

The toner images formed by the first station, the second station, the third station, and the fourth station based on image data are transferred onto the surface of the transfer belt 40 in a superimposed manner, and then the toner images on the transfer belt 40 are transferred onto a surface of the sheet 61 fed from the feed tray 60 by the transfer charger 48. The images are then fixed to the surface of the sheet 61 by the fixing rollers 50. The sheet 61 having the images formed thereon is discharged by the discharging rollers 58, and stacked on the discharge tray 501a.

As described above, according to the embodiment, the protection layer 106c has the three-layer structure including the uppermost layer, the intermediate layer, and the undermost layer. The uppermost layer and the undermost layer are formed by depositing $SiO_2$ that has high hydrophilic nature. The intermediate layer is formed by depositing $TiO_2$. The protection layer 106c is continuously formed on the reflection area a1 and the attachment areas a2. Thus, the protection layer 106c can be formed on the reflection area a1 and the attachment areas a2 in the same process. As a result, it is possible to improve the reflectivity of the reflection area a1 and to improve the attachment strength of the attachment areas a2 by increasing the hydrophilic nature of the attachment areas a2 in the same process.

Furthermore, according to the embodiment, because the protection layer 106c is formed on the attachment areas a2, the hydrophilic nature of the attachment areas a2 is improved. Therefore, it is possible to firmly attach the reflecting mirror 106 to the optical housing 100a with an adhesive.

Moreover, according to the embodiment, the thickness of the protection layer 106c is 1 nm to 1000 nm. Therefore, the high reflection effect (high reflectivity) of the reflection area a1 is further improved. Moreover, the permeability of the protection layer 106c having the above thickness is higher than a conventional layer. Therefore, when an adhesive is irradiated with an ultraviolet light via the transparent substrate 106a, it is possible to harden the adhesive by an ultraviolet light with less energy in a short time.

Furthermore, according to the embodiment, because the reflecting mirrors 106 and 306 are firmly attached to the optical housing 100a, it is possible to prevent positional deviation of the reflecting mirrors 106 and 306 with respect to the incidence optical system 200A, the incidence optical system 200B, and other optical elements included in the scanning optical system. Thus, it is possible to scan the surfaces of the photosensitive elements 30A, 30B, 30C, and 30D with high accuracy.

Moreover, according to the embodiment, because electrostatic latent images are formed on the surfaces of the photosensitive elements 30A, 30B, 30C, and 30D with high accuracy, images based on the electrostatic latent images can be formed on a sheet without color misalignment, or the like.

Although the image forming apparatus 500 includes the photosensitive elements 30A, 30B, 30C, and 30D to form a full color image, the present invention can be applied to an image forming apparatus that forms a single color image by, for example, irradiating a single photosensitive element with a plurality of light beams.

Furthermore, although the attachment areas a2 are formed on both ends of the transparent substrate 106a, the attachment area can be formed on one end of the transparent substrate 106a to which the supporting surface 101a of the rib 101B is attached.

Moreover, although the reflecting mirror 106 is attached to the optical housing 100a with the ultraviolet cure adhesive, the reflecting mirror 106 can be attached to the optical housing 100a with an electron beam curable adhesive or a thermosetting adhesive.

Although it is explained above that the optical scanning device 100 is used as a printer, the optical scanning device 100 can be used as a copy machine, a facsimile, or a multifunction product (MFP) having functions of these.

According to an aspect of the present invention, it is possible to improve the reflectivity of the reflection area and to improve the attachment strength of the attachment areas by increasing the hydrophilic nature of the attachment areas in a single process.

Furthermore, it is possible to scan a scanning surface with high accuracy over a long period.

Moreover, it is possible to form an image on a recording medium with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mirror comprising:
a substrate including a surface having a first area and a second area;
a reflection layer formed on the first area; and
a protection layer formed on an entirety of the first area with the reflection layer and the second area,
wherein the protection layer is light-permeable, is hydrophilic, and is electrically insulating, and
wherein the protection layer has a three-layer structure, the three layer structure including an undermost layer formed from silicon dioxide, an uppermost layer formed from silicon dioxide, and an intermediate layer formed from titanium oxide.

2. The mirror according to claim 1, wherein a thickness of the protection layer is from 1 nanometer to 1000 nanometers.

3. The mirror according to claim 1, wherein a portion of the substrate corresponding to the second area is optically transparent.

4. The mirror according to claim 1, wherein the reflection layer is formed directly on the substrate in the first area, and the protection layer is formed directly on the reflection layer in the first area and is formed directly on the substrate in the second area.

5. The mirror according to claim 4, wherein the reflection layer is formed on the substrate only in the first area.

6. The mirror according to claim 1, wherein the undermost layer is directly deposited on the reflection layer in the first area and is directly deposited on the substrate in the second area, the intermediate layer is directly deposited on the undermost layer in the first and second areas, and the uppermost layer is directly deposited on the intermediate layer in the first and second areas.

7. An optical scanning device that scans a scanning surface with a light beam in a main scanning direction, the optical scanning device comprising:
- a light source that emits a light beam;
- a first mirror that deflects the light beam in the main scanning direction; and
- a second mirror that reflects the light beam deflected by the first mirror,
- wherein the second mirror includes
  - a substrate including a surface having a first area and a second area,
  - a reflection layer formed on the first area, and
  - a protection layer formed on an entirety of the first area with the reflection layer formed and the second area, and
  - the protection layer is light-permeable, is hydrophilic, and is electrically insulating,
  - wherein the protection layer has a three-layer structure, the three layer structure including an undermost layer formed from silicon dioxide, an uppermost layer formed from silicon dioxide, and an intermediate layer formed from titanium oxide.

8. The optical scanning device according to claim 7, further comprising a housing that accommodates the light source, the first mirror, and the second mirror,
wherein the second area is attached to the housing.

9. An image forming apparatus comprising:
an optical scanning device according to claim 7;
a photosensitive element on which a latent image is formed by the optical scanning device;
a developing unit that develops the latent image with toner to form a toner image; and
a transfer unit that transfers the toner image onto a recording medium.

10. The image forming apparatus according to claim 9, wherein
the optical scanning device further includes a housing that accommodates the light source, the first mirror, and the second mirror, and
the second area is attached to the housing.

11. An image forming apparatus comprising:
an optical scanning device according to claim 7;
a plurality of photosensitive elements on which latent images in different colors are formed, respectively, by the optical scanning device,
a developing unit that develops the latent images with toners of different colors to form toner images of different colors, respectively, and
a transfer unit that transfers the toner images of different colors onto a recording medium in a superimposed manner to form a full color image.

12. The image forming apparatus according to claim 11, wherein
the optical scanning device further includes a housing that accommodates the light source, the first mirror, and the second mirror, and
the second area is attached to the housing.

13. The optical scanning device according to claim 7, wherein the reflection layer is formed directly on the substrate in the first area, and the protection layer is formed directly on the reflection layer in the first area and is formed directly on the substrate in the second area.

14. The optical scanning device according to claim 13, wherein the reflection layer is formed on the substrate only in the first area.

15. The optical scanning device according to claim 7, wherein the undermost layer is directly deposited on the reflection layer in the first area and is directly deposited on the substrate in the second area, the intermediate layer is directly deposited on the undermost layer in the first and second areas, and the uppermost layer is directly deposited on the intermediate layer in the first and second areas.

* * * * *